United States Patent [19]

Kobayashi et al.

[11] Patent Number: 4,483,933

[45] Date of Patent: Nov. 20, 1984

[54] SEMICONDUCTOR CERAMIC COMPOSITION

[75] Inventors: Takashi Kobayashi, Yokaichi; Motoi Nishii, Omihachiman, both of Japan

[73] Assignee: Murata Manufacturing Co., Ltd., Kyoto, Japan

[21] Appl. No.: 600,336

[22] Filed: Apr. 13, 1984

Related U.S. Application Data

[63] Continuation-in-part of Ser. No. 359,901, Mar. 19, 1982, abandoned.

[30] Foreign Application Priority Data

Mar. 24, 1981 [JP] Japan ................. 56-43727

[51] Int. Cl.³ ................. H01B 1/06; C04B 35/46
[52] U.S. Cl. ................. 501/138; 501/139; 252/520; 252/521
[58] Field of Search ............... 501/138, 139; 252/520, 252/521

[56] References Cited

U.S. PATENT DOCUMENTS

| | | | |
|---|---|---|---|
| 3,975,307 | 8/1976 | Metsuo et al. | 501/139 |
| 4,014,822 | 3/1977 | Fujikawa | 252/520 |
| 4,096,098 | 6/1978 | Umeya et al. | 252/520 |

FOREIGN PATENT DOCUMENTS

| | | | |
|---|---|---|---|
| 40391 | 11/1981 | European Pat. Off. | 501/139 |
| 2361230 | 6/1975 | Fed. Rep. of Germany | 501/138 |
| 52-41896 | 3/1977 | Japan | 501/138 |
| 54-125499 | 9/1979 | Japan | 501/138 |
| 1527060 | 10/1978 | United Kingdom | 501/138 |
| 585139 | 12/1977 | U.S.S.R. | 501/138 |

Primary Examiner—Mark Bell
Attorney, Agent, or Firm—Birch, Stewart, Kolasch & Birch

[57] ABSTRACT

A semiconductor ceramic composition of a barium titanate system comprises a main component containing a minor quantity of one or more semiconductor-forming elements, and additives of manganese oxides and silica incorporated therein, and is characterized by that the main component consists essentially of 30 to 95 mol % of $BaTiO_3$, 3 to 25 mol % of $CaTiO_3$, 1 to 30 mol % of $SrTiO_3$ and 1 to 50 mol % of $PbTiO_3$. The contents of manganese oxides and silica are 0.03 to 0.15 mol %, preferably, 0.03 to 0.10 mol % in terms of Mn, and 0.5 to 5 mol % in terms of $SiO_2$, respectively, with respect to one mole of the main component. One or more semiconductor-forming elements are selected from the group consisting of rare earth elements, Nb, Bi, Sb, W and Th, and the content of the elements is 0.2 to 1.0 mol %.

7 Claims, 1 Drawing Figure

SEMICONDUCTOR CERAMIC COMPOSITION

This is a continuation-in-part application of Ser. No. 359,901, filed on Mar. 19, 1982, now abandoned.

BACKGROUND OF THE INVENTION

1. Field of the Invention

This invention relates to a semiconductor ceramic composition of a barium titanate system and, more particularly, to a semiconductor ceramic composition with a positive resistance temperature characteristic, which has a low specific resistance, a high breakdown voltage and an excellent inrush-stability.

2. Description of the Prior Art

It is well known that semiconductor ceramics of a barium titanate system, comprising barium titanate doped with a small amount of one or more semiconductor-forming elements selected form the group consisting of oxides of Nb, Bi, Sb, W, Th and rare earth elements such as Y, La and Ce, have a positive temperature coefficient of resistance and possess an abrupt positive change of resistance at a temperature over a curie point. In practical applications, however, the semiconductor ceramics with a positive resistance-temperature characteristic are required to have other physical and electrical properties such as, for example, a desired curie point, low specific resistance at ordinary temperature, a large temperature coefficient of resistance at a temperature over the curie point, a high breakdown voltage, and good inrush-switching stability. For this reason, various modifications of semiconductor ceramics have been proposed in various patents, for example, U.S. Pat. Nos. 3,975,307 and 4,096,098 to improve the above properties. For example, it has been proposed to replace a part of the barium in barium titanate with a lead to shift the curie temperature from the normal curie point of 120° C. to a higher temperature. Also, it has been proposed to replace a part of the barium with Sr or replace a part of the titanium with Zr or Sn to shift the curie point to a lower temperature.

On the other hand, to improve the resistance change rate at a temperature over the curie point it has been proposed to incorporate Mn in an amount of 0.03 to 0.15 mole % into the composition. Also, It has been proposed to decrease the specific resistance at ordinary temperature by the addition of $SiO_2$ in an amount of 0.5 to 5 mol %.

Such modified semiconductor ceramics can be utilized in positive temperature coefficient(PTC) thermistors for use as thermostat heating elements, current control elements, thermal control elements and the like.

However, such conventional semiconductor ceramic compositions provide a narrow application flexibility so that semiconductor ceramics for one purpose cannot be used for other purposes. Also, the conventional semiconductor ceramics have a serious drawback awaiting a solution. For example, the lead-modified barium titanate semiconductor ceramics have been utilized in current control elements in starting circuits for motors, but these current control elements have a tendency to break stratiformly. In the starting circuits, a large inrush current flows for a relatively long time. This problem can be solved by replacing a part of the barium in $BaTiO_3$ with lead and calcium and incorporating silica and manganese into the basic composition. Such semiconductor ceramics cannot be used for various purposes, but only to current control elements for use in the starting circuits for motors.

It has been reported that barium titanate semiconductor ceramics modified with calcium or with calcium and strontium, and containing Mn and $SiO_2$ possess low specific resistance, less than 10 ohm-cm, at ordinary temperature and have a dielectric breakdown voltage of 48 V/mm at the maximum. However, this breakdown voltage is too low to put the semiconductor ceramics into practical use, and they are poor with respect to the inrush-switching stability when there is applied an AC inrush voltage.

Also, semiconductor ceramics of a barium titanate have been proposed in which a part of the barium in $BaTiO_3$ is replaced with lead and strontium, and Mn and $SiO_2$ are incorporated therein. Such semiconductor ceramics exhibit excellent breakdown voltage characteristics and high-temperature load characteristic, but it is impossible to obtain an excellent inrush-switching stability.

U.S. Pat. No. 4,014,822 discloses semiconductor ceramic composition consisting essentially of 83.95 to 98.65 mol % of barium titanate, 0.13 to 0.45 mol % of manganese oxide, 0.20 to 15 mol % of silicon dioxide, and 0.23 to 1.65 mol % of one or more oxides of rare earth elements, bismuth and antimony, and the content of said one or more oxides being 0.10 to 1.20 mol % greater than the content of manganese oxide. Also, it discloses replacement of a part of the barium in $BaTiO_3$ with one or more oxides selected from the group of strontium oxide, calcium oxide and lead oxide. Such semiconductor ceramics have high positive resistance temperature characteristic, small dependency of resistance on voltage, and excellent high-voltage resistant life characteristic. However, they have a disadvantage that an increase in the breakdown voltage and inrush-switching stability increases a specific resistance at ordinary temperature considerably.

It has now been found that the joint addition of Pb, Sr and Ca to the barium titanate semiconductor ceramics composition enables to produce semiconductor ceramics which can be used for various purposes such as, for example, as positive temperature coefficient thermistors for use in motor-starting circuit, degausing circuits, thermostat heating devices and the like.

SUMMARY OF THE INVENTION

It is therefore an object of the present invention to provide an improved semiconductor ceramic of a barium titanate system which overcomes the above stated disadvantages and has various uses.

Another object of the present invention is to provide an improved semiconductor ceramic with a positive resistance-temperature characteristic which has a low specific resistance at ordinary temperature, will withstand high voltage and exhibit excellent inrush-switching stability.

According to the present invention there is provided a semiconductor ceramic composition of a barium titanate system, consisting essentially of a main component containing a small amount of one or more semiconductor-forming elements, and additives of manganese oxide and silica, said main component consisting essentially of 30 to 95 mol % of $BaTiO_3$, 3 to 25 mol % of $CaTiO_3$, 1 to 30 mol % of $SrTiO_3$ and 1 to 50 mol % of $PbTiO_3$, said semiconductor-forming elements being selected from the group consisting of rare earth elements, Nb, Bi, Sb, W and Th, wherein the content of manganese oxides is 0.03 to 0.15 mol %, preferably, 0.03 to 0.10 mol % in terms of Mn with respect to one mole of the main component, and wherein the content of silica is 0.5 to 5 mol % in terms of $SiO_2$ with respect to one mole of the main component.

The main component consists essentially of $BaTiO_3$, $CaTiO_3$, $SrTiO_3$ and $PbTiO_3$. In other words, a part of the barium in barium titanate is replaced with Ca, Sr and Pb. Thus, the composition of the above main component may be expressed by the general formula:

$(Ba_{1-x-y-z}Ca_xSr_yPb_z)_mTiO_3$ where x, y and z are mole fractions of the respective components, $1-x-y-z$ is 0.30 to 0.95, x is 0.03 to 0.25, y is 0.01 to 0.30, z is 0.01 to 0.50, m is a mole ratio of $(Ba_{1-x-y-z}Ca_xSr_yPb_z)$ to Ti and takes a value of 0.99 to 1.03. Although the sole addition of Pb or Sr to barium titanate contributes to shift the curie point thereof to a higher or lower temperature, unexpected results can be obtained by the joint addition of Pb, Sr and Ca. It has now been found that the joint addition of Pb, Sr and Ca to the barium titanate doped with one or more semiconductor-forming elements contributes to improve the breakdown voltage and the resistance against inrush current. Additionally, the coexistence of Pb, Sr and Ca also provides the effect that the sintering temperature may be decreased by 50° C. with respect to the conventional sintering temperature of the barium titanate ceramics.

The reasons why the composition of the main component has been defined as above are as follows:

If the content of $BaTiO_3$ is less than 30 mol %, it is difficult to produce semiconductor ceramics and results in the increase of the specific resistance. If the content of $BaTiO_3$ is more than 95 mol %, it results in the considerable deterioration of the electrical characteristics;

If the content of $CaTiO_3$ is less than 3 mol %, it provides no effect on the characteristics. If the content is more than 25 mol %, it results in the lowering of the breakdown voltage and the inrush switching stability;

If the content of $SrTiO_3$ is less than 1 mol %, it provides no effect on the characteristics, and if more than 30 mol %, it results in the deterioration of the electrical properties; and, If the content of $PbTiO_3$ is less than 1 mol %, it has no effect on the characteristics and, the produced ceramics cannot be put into practical use. The content of $PbTiO_3$ exceeding 50 mol % makes it difficult to produce semiconductor ceramics.

As the semiconductor-forming elements, there may be used at least one element selected from the group consisting of the rare earth elements, Nb, Bi, Sb, W and Th. The rare earth elements include, without being limited thereto, Y, La and Ce. One or more semiconductor-forming elements may be incorporated into the composition in an amount of 0.2 to 1.0 mol %. The addition out of this range results in the increase of the specific resistance.

According to the present invention, manganese oxides are further incorporated into the semiconductor ceramic composition. The content of manganese oxides is 0.03 to 0.15 mol %, preferably, 0.03 to 0.10 mol % in terms of Mn with respect to the main component. The incorporation of manganese makes it possible to considerably increase the resistance-temperature change rate in the positive resistance-temperature characteristic over the curie point. The content of Mn has been limited to a range of 0.03 to 0.15 mol %, preferably, a range from 0.03 to 0.10 mol % for the reasons that a content less than 0.03 mol % does not contribute to improve the temperature characteristics, and a content more than 0.15 mol % results in the considerable increase of the specific resistance. Although a content less than 0.15 mol % makes it possible to improve the positive resistance-temperature change rate, a content of Mn more than 0.10 mol % causes an abrupt increase of the specific resistance at ordinary temperature even if silica is incorporated into the composition. A semiconductor ceramic containing more than 0.10 mol % of Mn has a specific resistance more than 400 ohm-cm, thus making it difficult to produce the general-purpose PTC thermistors. Because, if a PTC thermistor having a specific resistance of more than 400 ohm-cm is used as a thermostat heating element, it is not possible to generate heat sufficient for the practical use. Also, if such a PTC thermistor is used as a current control element in the starting circuit for a motor, it is impossible to start the motor since the PTC thermistor prevents a flow of an initial large current. If such a PTC thermistor is utilized in a degausing circuit, it is impossible to obtain a sufficient degausing effect. Since the degausing effect of the degausing circuit used in a color television receiving set or a chathode ray tube display depends on the strength of the magnetic field which is given by the equation: $H = A \times N$ (where A is a current in a coil, N is the number of turns), the current decreases with increase of an initial resistance of the PTC thermistor, provided that the number of turns N be constant.

The semiconductor ceramic composition according to the present invention further contains silica in an amount of 0.5 to 5 mol % in terms of $SiO_2$. The addition of silica contributes to control the change of specific resistance due to the variation of the added amount of the semiconductor-forming elements, and to lower the specific resistance at ordinary temperature. The addition of silica out of the above range makes it impossible to obtain such effects.

According to the present invention, it is possible to produce semiconductor ceramics which have a desired curie point and a low specific resistance, and are excellent in the breakdown voltage characteristic and the inrush switching stability, thus making it possible to produce the general-purpose PTC thermistors which can be used as current controllers, thermal controllers, thermostat heating elements, and the like.

Other objects, features and advantages of the present invention will be further apparent from the following description taken in conjunction with the accompanying drawing and examples.

EXAMPLE 1

Figure 1:
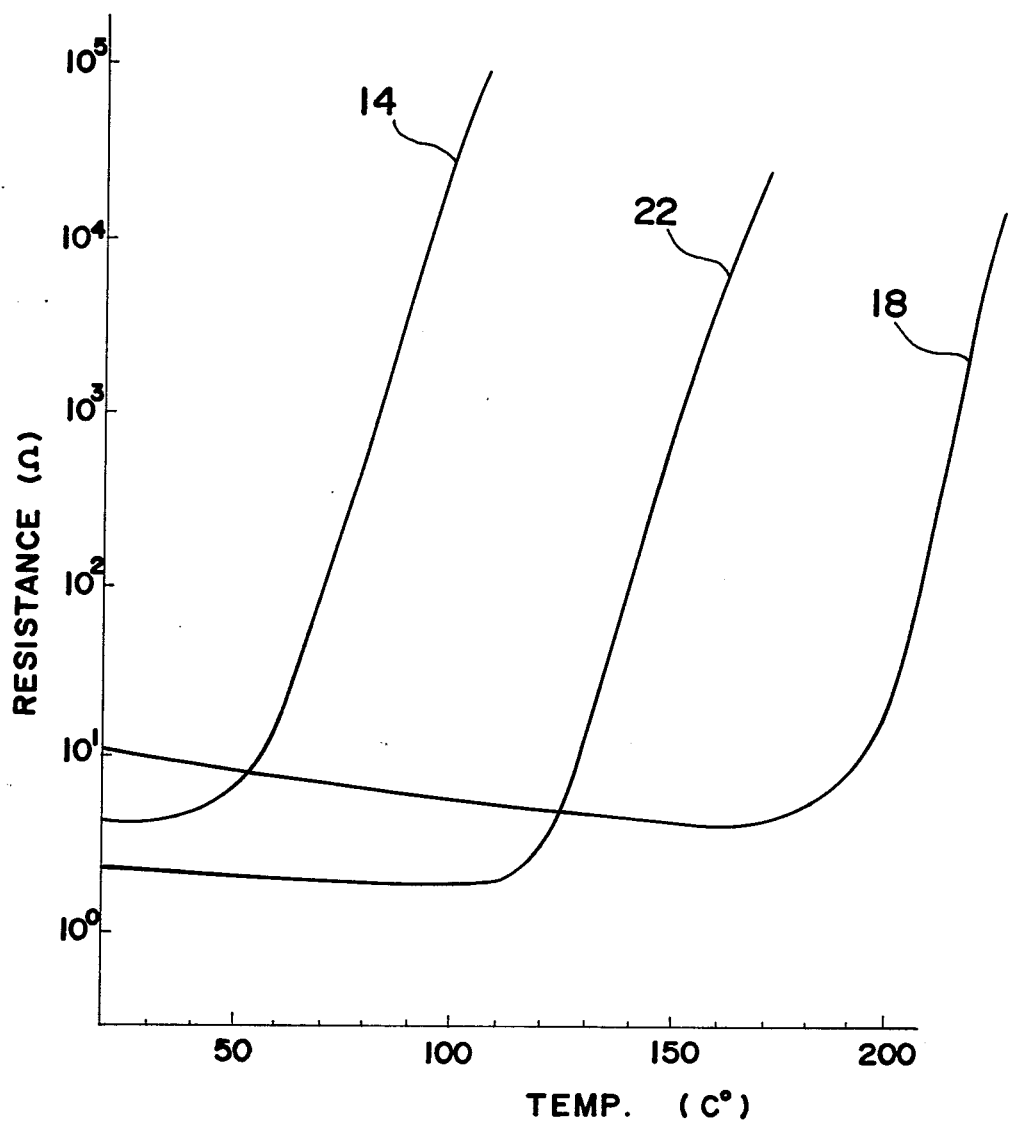
FIG. 1 is a diagram showing resistance-temperature characteristics of semiconductor ceramics of a barium titanate system according to the present invention.

There were prepared $BaCO_3$, $CaCO_3$, $SrCO_3$, $Pb_3O_4$ and $TiO_2$ as raw materials for the main component, $Y_2O_3$, $La_2O_3$, $CeO_2$ and $Nd_2O_3$ as semiconductor-forming elements, $MnCO_3$ and $SiO_2$ as additives. These raw materials were weighed so as to have a composition with a compositional proportion shown in Table 1, then mixed by the wet process, dehydrated, dried and then calcined at 1150° C. for 1 hour. The clinker was crushed, ground, pulverized and then shaped into disks under a pressure of 1000 kg/cm². The disks were fired at 1280° C. for 1.5 hours to obtain semiconductor ceramic disks with a diameter of 17.5 mm and a thickness of 2.5 mm. The resultant semiconductor ceramic discs were provided with electrodes of In-Ga alloy on its both surfaces.

The thus obtained specimens were subjected to measurements of resistance at ordinary temperature (25° C.), the breakdown voltage characteristic, a curie point, and the inrush switching stability. The results are shown in Table 2.

For the specimen No. 24, it was impossible to measure the characteristics. Because, the disks were partially melted during the firing step, resulting in the conglutination of the disks.

In Table 2, the breakdown voltage characteristic is given by the maximum voltage that could be applied to the specimen before the specimen was broken by applying an instantaneous voltage which increases step by step, and the inrush switching stability is given by the maximum voltage that could be applied before the specimen was broken by applying an AC inrush voltage instantaneously.

In Tables 1 and 2, the asterisked specimens are compositions out of the scope of the present invention and, others are those falling in the scope of the present invention.

TABLE 1

| Specimen No. | Main component (mol %) BaTiO₃ | CaTiO₃ | SrTiO₃ | PbTiO₃ | Semiconductor-forming element (mol %) | Additive (mol %) Mn | SiO₂ |
|---|---|---|---|---|---|---|---|
| 1* | 100 | 0 | 0 | 0 | Y₂O₃:0.4 | 0.05 | 2 |
| 2* | 85 | 15 | 0 | 0 | " | " | " |
| 3* | 92 | 0 | 8 | 0 | " | " | " |
| 4* | 95 | 0 | 0 | 5 | " | " | " |
| 5* | 87 | 0 | 8 | 5 | " | " | " |
| 6* | 85 | 2 | 8 | 5 | " | " | " |
| 7 | 82 | 5 | 8 | 5 | " | " | " |
| 8 | 77 | 10 | 8 | 5 | " | " | " |
| 9 | 67 | 20 | 8 | 5 | " | " | " |
| 10* | 57 | 30 | 8 | 5 | " | " | " |
| 11* | 80 | 15 | 0 | 5 | " | " | " |
| 12 | 78 | 15 | 2 | 5 | " | " | " |
| 13 | 65 | 15 | 15 | 5 | " | " | " |
| 14 | 55 | 15 | 25 | 5 | " | " | " |
| 15* | 45 | 15 | 35 | 5 | " | " | " |
| 16* | 77 | 15 | 8 | 0 | " | " | " |
| 17 | 75 | 15 | 8 | 2 | " | " | " |
| 18 | 52 | 15 | 8 | 25 | " | " | " |
| 19 | 32 | 15 | 8 | 45 | " | " | " |
| 20* | 27 | 20 | 25 | 28 | " | " | " |
| 21* | 17 | 15 | 8 | 60 | " | " | " |
| 22 | 72 | 15 | 8 | 5 | " | " | " |
| 23* | 72 | 15 | 8 | 5 | " | " | 0.2 |
| 24* | 72 | 15 | 8 | 5 | " | " | 8.2 |
| 25* | 72 | 15 | 8 | 5 | " | 0.01 | 2 |
| 26* | 72 | 15 | 8 | 5 | " | 0.20 | " |
| 27* | 72 | 15 | 8 | 5 | Y₂O₃:0.1 | 0.05 | " |
| 28 | 72 | 15 | 8 | 5 | Y₂O₃:0.8 | " | " |
| 29* | 72 | 15 | 8 | 5 | Y₂O₃:1.2 | " | " |
| 30 | 72 | 15 | 8 | 5 | La₂O₃:0.4 | " | " |
| 31 | 72 | 15 | 8 | 5 | CeO₂:0.4 | " | " |
| 32 | 72 | 15 | 8 | 5 | Nd₂O₃:0.4 | " | " |

TABLE 2

| Specimen No. | Resistance (ohm) | Breakdown voltage (Max) (V) | Curie point (°C.) | inrush switching stability (V) |
|---|---|---|---|---|
| 1* | 2.34 | 200 | 129.4 | 70 |
| 2* | 2.26 | 224 | 128.2 | 100 |
| 3* | 2.12 | 200 | 100.3 | 120 |
| 4* | 2.42 | 224 | 138.1 | 100 |
| 5* | 3.69 | 250 | 130.6 | 180 |
| 6* | 4.01 | 280 | 129.4 | 200 |
| 7 | 4.38 | 560 | 128.8 | 355 |
| 8 | 4.98 | 630 | 127.5 | 400 |
| 9 | 5.32 | 500 | 126.6 | 400 |
| 10* | 43.44 | 450 | 123.8 | 315 |
| 11* | 4.04 | 250 | 136.0 | 180 |
| 12 | 4.13 | 560 | 131.7 | 355 |
| 13 | 4.57 | 630 | 87.0 | 400 |
| 14 | 4.89 | 560 | 56.3 | 355 |
| 15* | 7.98 | 450 | 36.8 | 250 |
| 16* | 2.96 | 224 | 90.5 | 120 |
| 17 | 6.64 | 500 | 143.7 | 400 |
| 18 | 10.52 | 720 | 194.9 | 630 |
| 19 | 15.71 | 800 | 283.8 | 560 |
| 20* | 127.0 | — | — | — |
| 21* | 284.7 | — | — | — |
| 22 | 3.83 | 500 | 125.7 | 315 |
| 23* | 121.28 | — | 122.3 | — |
| 24* | — | — | — | — |
| 25* | 103.24 | 200 | 121.4 | — |
| 26* | 982.53 | — | — | — |
| 27* | 3.53K | — | 118.2 | — |
| 28 | 8.93 | 560 | 122.7 | 500 |
| 29* | 622.3 | — | 120.6 | — |
| 30 | 4.20 | 560 | 124.3 | 315 |
| 31 | 4.08 | 500 | 125.7 | 280 |
| 32 | 4.57 | 560 | 125.1 | 315 |

As can be seen from the results in Table 2, specimens Nos. 7, 8, 9, 12, 22, 28, 30, 31, 32 have high breakdown voltages and high inrush-switching stability. Thus, these semiconductor ceramics are very useful as materials for current control elements for starting of motors.

As can be seen from FIG. 1, the specimen No. 14 has high breakdown voltage and a sharp increase in resistivity, thus making it possible to produce PTC thermistors for use in the degausing circuit in color television receiving sets.

Specimens Nos. 17, 18 and 19 possess high curie points in addition to low specific resistance, high breakdown voltage and high inrush-current stability, so that these semiconductor ceramics are particularly useful as a material for thermostat heating elements which requires a large quantity of heat generation. Since these semiconductor ceramics have high breakdown voltage, they ensures safe operation.

EXAMPLE 2

Using powder of $BaCO_3$, $CaCO_3$, $SrCO_3$, $Pb_3O_4$, $TiO_2$ $Y_2O_3$, $MnCO_3$ and $SiO_2$ as raw materials, there were prepared mixtures each having a composition shown in Table 3, mixed by the wet process, dehydrated and then dried. The resultant mixture was then calcined at 1150° C. for 1 hour, crushed, ground and then pulverized with a suitable amount of an organic binder. The pulverized powder was shaped into disks under a pressure of 1000 kg/cm² and then fired at 1340 ° C. for 1.5 hours to obtain semiconductor ceramic disks with a diameter of 17.5 mm and a thickness of 2.5 mm. The resultant semiconductor ceramic discs were provided with electrodes of In-Ga alloy on its both surfaces.

The thus obtained specimens were subjected to measurements of resistance, specific resistance at ordinary temperature (25° C.), the breakdown voltage characteristic, curie point, and inrush switching stability. The results are shown in Table 4.

In Tables 3 and 4, the asterisked specimens are those having a composition out of the scope of the present invention and, others are those falling in the scope of the present invention.

TABLE 4

| Specimen No. | Resistance (ohm) | Resistivity (ohm-cm) | Breakdown voltage (V) | Curie point (°C.) | inrush switching stability (V) |
|---|---|---|---|---|---|
| 7-1 | 6.95 | 66.9 | 630 | 127.4 | 400 |
| 7-2 | 8.01 | 77.1 | 720 | 125.8 | 450 |
| 7-3 | 15.92 | 153 | 800 | 122.6 | 560 |
| 7-4* | 42.25 | 406 | 800> | 119.7 | 630 |
| 7-5* | 86.13 | 829 | 800> | 116.3 | 720 |
| 7-6* | 130.8 | 1.26k | 800> | 112.5 | 800> |
| 8-1 | 8.10 | 77.9 | 720 | 126.1 | 450 |
| 8-2 | 9.65 | 92.8 | 800 | 125.2 | 450 |
| 8-3 | 17.98 | 173 | 800> | 122.8 | 500 |
| 8-4* | 52.51 | 505 | 800> | 118.5 | 560 |
| 8-5* | 122.9 | 1.18k | 800> | 114.3 | 630 |
| 8-6* | 218.0 | 2.10k | 800> | 111.6 | 800> |
| 13-1 | 7.65 | 73.6 | 560 | 83.2 | 450 |
| 13-2 | 8.02 | 77.2 | 630 | 82.6 | 500 |
| 13-3 | 16.29 | 157 | 800 | 80.1 | 720 |
| 13-4* | 43.87 | 422 | 800> | 77.4 | 800> |
| 13-5* | 96.42 | 928 | 800> | 75.2 | 800> |
| 13-6* | 146.8 | 1.41k | 800> | 72.0 | 800> |
| 18-1 | 13.94 | 134 | 800 | 192.6 | 630 |
| 18-2 | 16.67 | 160 | 800 | 190.9 | 720 |
| 18-3 | 28.01 | 269 | 800> | 187.8 | 720 |
| 18-4* | 70.10 | 674 | 800> | 185.6 | 800> |
| 18-5* | 213.5 | 2.05k | 800> | 182.8 | 800> |
| 18-6* | 400.2 | 3.85k | 800> | 179.9 | 800> |
| 19-1 | 19.75 | 190 | 800 | 282.5 | 560 |
| 19-2 | 24.23 | 233 | 800> | 281.8 | 630 |
| 19-3 | 39.63 | 381 | 800> | 279.7 | 720 |
| 19-4* | 110.2 | 1.06k | 800> | 275.4 | 800> |
| 19-5* | 490.5 | 4.72k | 800> | 272.1 | 800> |
| 19-6* | 880.7 | 8.47k | 800> | 268.1 | 800> |

As can be seen from Tables 3 and 4, an increase in the content of Mn in the semiconductor ceramics of (Ba,Ca,Sr,Pb)Ti₃ system increases the breakdown voltage and the inrush switching stability. However, it causes an increase of the specific resistance at ordinary temperature. Particularly, if the content of Mn exceeds 0.10 mol %, the specific resistance increases abruptly and takes a

TABLE 3

| Specimen No. | Main component (mol %) | | | | $Y_2O_3$ (mol %) | Additive (mol %) | |
|---|---|---|---|---|---|---|---|
| | $BaTiO_3$ | $CaTiO_3$ | $SrTiO_3$ | $PbTiO_3$ | | Mn | $SiO_2$ |
| 7-1 | 82 | 5 | 8 | 5 | 0.4 | 0.07 | 2 |
| 7-2 | " | " | " | " | " | 0.08 | " |
| 7-3 | " | " | " | " | " | 0.10 | " |
| 7-4* | " | " | " | " | " | 0.12 | " |
| 7-5* | " | " | " | " | " | 0.14 | " |
| 7-6* | " | " | " | " | " | 0.15 | " |
| 8-1 | 67 | 20 | 8 | 5 | 0.4 | 0.07 | 2 |
| 8-2 | " | " | " | " | " | 0.08 | " |
| 8-3 | " | " | " | " | " | 0.10 | " |
| 8-4* | " | " | " | " | " | 0.12 | " |
| 8-5* | " | " | " | " | " | 0.14 | " |
| 8-6* | " | " | " | " | " | 0.15 | " |
| 13-1 | 65 | 15 | 15 | 5 | 0.4 | 0.07 | 2 |
| 13-2 | " | " | " | " | " | 0.08 | " |
| 13-3 | " | " | " | " | " | 0.10 | " |
| 13-4* | " | " | " | " | " | 0.12 | " |
| 13-5* | " | " | " | " | " | 0.14 | " |
| 13-6* | " | " | " | " | " | 0.15 | " |
| 18-1 | 52 | 15 | 8 | 25 | 0.4 | 0.07 | 2 |
| 18-2 | " | " | " | " | " | 0.08 | " |
| 18-3 | " | " | " | " | " | 0.10 | " |
| 18-4* | " | " | " | " | " | 0.12 | " |
| 18-5* | " | " | " | " | " | 0.14 | " |
| 18-6* | " | " | " | " | " | 0.15 | " |
| 19-1 | 32 | 15 | 8 | 45 | 0.4 | 0.07 | 2 |
| 19-2 | " | " | " | " | " | 0.08 | " |
| 19-3 | " | " | " | " | " | 0.10 | " |
| 19-4* | " | " | " | " | " | 0.12 | " |
| 19-5* | " | " | " | " | " | 0.14 | " |
| 19-6* | " | " | " | " | " | 0.15 | " | value of more than 400 ohm-cm, thus making it impossible to produce semiconductor ceramics with positive temperature coefficient of resistance which can be utilized in the general purpose PTC thermistors. In contrast therewith, the semiconductor ceramics according to the present invention have a low specific resistance, a high breakdown voltage, and high inrush-switching stability, thus making it possible to produce the general-purpose PTC thermistors for use in motor-starting circuits, thermostat heating circuits, erasing circuits and the like.

What we claim is:

1. A semiconductor ceramic composition of a barium titanate system having a specific resistance of 400 ohm-cm or less, consisting essentially of a main component containing a small amount of one or more semiconductor-forming elements, and additives of manganese oxide and silica, said main component consisting essentially of 30 to 95 mol % of $BaTiO_3$, 3 to 25 mol % of $CaTiO_3$, 1 to 30 mol % of $SrTiO_3$ and 1 to 50 mol % of $PbTiO_3$, said semiconductor-forming elements being selected from the group consisting of rare earth elements, Nb, Bi, Sb, W and Th, and being present in an amount of 0.2 to 1.0 mol %, wherein the content of manganese oxides is 0.03 to 0.10 mol % in terms of Mn with respect to one mole of the main component, and wherein the content of silica is 0.5 to 5 mol % in terms of $SiO_2$ with respect to one mole of the main component.

2. A semiconductor ceramic composition according to claim 1 wherein the main component having a composition expressed by the general formula:

$$(Ba_{1-x-y-z}Ca_xSr_yPb_z)_mTiO_3$$

where x, y and z are respective mole fractions, $1-x-y-z$ is 0.30 to 0.95, x is 0.03 to 0.25, y is 0.01 to 0.30, z is 0.01 to 0.50 mol %, m is a mole ratio of $(Ba_{1-x-y-z}Ca_xSr_yPb_z)$ to Ti and takes a value of 0.99 to 1.03.

3. A semiconductor ceramic composition according to claim 1 wherein said main component consisting essentially of 82 mol % of $BaTiO_3$, 5 mol % of $CaTiO_3$, 8 mol % of $SrTiO_3$ and 5 mol % of $PbTiO_3$.

4. A semiconductor ceramic composition according to claim 1 wherein said main component consisting essentially of 67 mol % of $BaTiO_3$, 20 mol % of $CaTiO_3$, 8 mol % of $SrTiO_3$ and 5 mol % of $PbTiO_3$.

5. A semiconductor ceramic composition according to claim 1 wherein said main component consisting essentially of 65 mol % of $BaTiO_3$, 15 mol % of $CaTiO_3$, 15 mol % of $SrTiO_3$ and 5 mol % of $PbTiO_3$.

6. A semiconductor ceramic composition according to claim 1 wherein said main component consisting essentially of 52 mol % of $BaTiO_3$, 15 mol % of $CaTiO_3$, 8 mol % of $SrTiO_3$ and 25 mol % of $PbTiO_3$.

7. A semiconductor ceramic composition according to claim 1 wherein said main component consisting essentially of 32 mol % of $BaTiO_3$, 15 mol % of $CaTiO_3$, 8 mol % of $SrTiO_3$ and 45 mol % of $PbTiO_3$.

* * * * *